(12) United States Patent  
Kawasaki et al.

(10) Patent No.: US 7,898,919 B2  
(45) Date of Patent: Mar. 1, 2011

(54) OPTICAL PICKUP APPARATUS

(75) Inventors: Ryoichi Kawasaki, Gunma (JP); Shigeki Masaka, Gunma (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 405 days.

(21) Appl. No.: 11/864,628

(22) Filed: Sep. 28, 2007

(65) Prior Publication Data

US 2008/0084796 A1    Apr. 10, 2008

(30) Foreign Application Priority Data

Oct. 6, 2006   (JP) .................................. 2006-274768

(51) Int. Cl.  
*G11B 7/00*   (2006.01)

(52) U.S. Cl. ...................... 369/53.19; 369/44.32; 369/94

(58) Field of Classification Search .............. 369/53.19, 369/44.32, 94, 44.23, 112.01, 112.02  
See application file for complete search history.

(56) References Cited

U.S. PATENT DOCUMENTS

| | | | | |
|---|---|---|---|---|
| 6,125,088 | A * | 9/2000 | Ogasawara | 369/44.32 |
| 7,372,794 | B2 * | 5/2008 | Kim et al. | 369/53.19 |
| 7,406,007 | B2 * | 7/2008 | Kuze et al. | 369/53.19 |
| 2002/0006090 | A1 * | 1/2002 | Kawano | 369/44.32 |
| 2005/0078574 | A1 * | 4/2005 | Wada et al. | 369/44.32 |
| 2005/0117472 | A1 * | 6/2005 | Raaymakers | 369/53.19 |
| 2005/0185535 | A1 * | 8/2005 | Kawasaki | 369/44.32 |
| 2006/0262702 | A1 * | 11/2006 | Ide et al. | 369/112.01 |
| 2007/0104045 | A1 * | 5/2007 | Nagura | 369/44.32 |

FOREIGN PATENT DOCUMENTS

JP   2006-172605   6/2006  
JP   2006147069    6/2006

* cited by examiner

*Primary Examiner* — Thang V Tran  
(74) *Attorney, Agent, or Firm* — Fish & Richardson P.C.

(57) ABSTRACT

An optical pickup apparatus reading signal recorded on signal recording layer of first and second optical discs different in distance from incident surface of laser light to the layer, comprising: an objective lens to be changed in numerical aperture for reading signal from the discs; a focus coil to displace the lens in direction toward surfaces of the discs; a tracking coil to displace the lens in radial direction of the discs; a tilt coil to correct optical-axis angle of the lens to the surfaces; a numerical aperture changing element to change the numerical aperture so that the light is focused on the layers of the discs; an incident angle changing element to change incident angle of the light to the lens so that the light is focused on the layers; and a tilt control unit to control driving of the tilt coil to correct coma aberration.

6 Claims, 2 Drawing Sheets

OPTICAL PICKUP APPARATUS

CROSS-REFERENCE TO RELATED APPLICATION

This application claims the benefit of priority to Japanese Patent Application No. 2006-274768, filed Oct. 6, 2006, of which full contents are incorporated herein by reference.

BACKGROUND OF THE INVENTION

1. Field of the Invention

The present invention relates to an optical pickup apparatus that performs an operation of reading out a signal recorded in an optical disc or of recording a signal in the optical disc by use of a laser light.

2. Description of the Related Art

An optical disc device is widely used that is capable of performing an operation of reading out a signal or recording a signal by applying a laser light irradiated from an optical pickup apparatus to a signal recording layer of an optical disc.

While the optical disc device using the optical disc called CD or DVD is generally in wide use, recently the optical disc device has been developed that uses the optical disc with improved recording density, namely, the optical disc of Blu-ray standard or HD-DVD (High Density Digital Versatile Disc) standard.

The laser light used for the operation of reading out the signal recorded in the optical disc of the CD standard is an infrared light with 780 nm wavelength and the laser light used for the operation of reading out the signal recorded in the optical disc of the DVD standard is a red light with 650 nm wavelength.

As opposed to the laser light for such optical discs of the CD standard and the DVD standard, the laser light used for the operation of reading out the signal recorded on the optical disc of the Blu-ray standard or the HD-DVD standard is a laser light with a shorter wavelength, for example, a blue light with 405 nm wavelength.

A protective layer provided over the signal recording layer in the optical disc of the Blu-ray standard is 0.1 mm thick and the numerical aperture of an objective lens used for performing the operation of reading out the signal from this signal recording layer is set at 0.85.

On the other hand, the protective layer provided over the signal recording layer in the optical disc of the HD-DVD standard is 0.6 mm thick and the numerical aperture of the objective lens used for performing the operation of reading out the signal from this signal recording layer is set at 0.65.

As described above, since the blue light with 405 nm wavelength may be used as the laser light for performing the operation of reading out the signal recorded in the optical disc of the Blu-ray standard and the HD-DVD standard, the optical pickup apparatus capable of performing the operation of reading out the signal from the optical discs of these two standards may be produced by using a laser diode commonly for both usages.

However, since these two optical discs have their signal recording layers provided at positions with different distances with respect to each other from a laser light incident surface, the distances from the objective lens to the signal recording layers greatly differ between these two optical discs. Since both optical discs are largely different in numerical aperture required by the objective lens as described above, the numerical aperture must be switched corresponding to each optical disc, to read out the signal from both optical discs. There has been developed the optical pickup apparatus that is capable of performing such operation (see Japanese Patent Application Laid-Open Publication No. 2006-172605).

The optical pickup apparatus conforming to the optical disc standards with such improved recording density is required to meet severe optical characteristics for enhancing signal recording quality in accordance with the improvement of the recording density.

The optical pickup apparatus is configured to be capable of controlling a driving current supplied to the laser diode so as to obtain laser power suitable for reading out the signal in the optical disc or for recording the signal in the optical disc.

The optical pickup apparatus is configured to be capable of performing a control operation of focusing the laser light irradiated from the optical pickup apparatus on the signal recording layer of the optical disc, namely, a focusing control operation, and a control operation of causing the spot of the laser light to follow a signal track, namely, a tracking control operation.

In the optical disc apparatus, while the optical disc is driven to rotate when placed on a turntable driven to rotate by a spindle motor, a tilt is caused to the optical disc due to a warpage of the optical disc itself, the state of placement of the optical disc on the turntable, and a mechanical error. When the optical disc tilts, the angle of an optical axis of the laser light relative to the signal surface of the optical disc deviates from the optimum state.

Since the deviation of the optical axis of the laser light relative to the signal surface of the optical disc described above becomes a great problem in accordance with an increasingly higher density of the signal recorded in the optical disc, an optical pickup apparatuses in recent times has been developed to include a tilt coil capable of performing an operation of adjusting the tilt of the optical axis of the laser light, what is called tilt controlling operation.

The technology described in patent reference 1 described above makes it possible to manufacture the optical pickup apparatus for performing the operation of reading out the signal recorded on the optical disc of the Blu-ray standard and the HD-DVD standard. However, the optical pickup apparatus has a problem that occurrence of: spherical aberration due to the thickness, etc., of a cover layer between the laser light incident surface and the signal recording layer of the optical disc; and the aberration called coma aberration prevent the signal reproducing operation and the signal recording operation from being normally performed, and the technology has been developed for solving such a problem (see Japanese Patent Application Laid-Open Publication No. 2006-147069).

In the technology described in Japanese Patent Application Laid-Open Publication No. 2006-147069, it is possible to correct the spherical aberration and the coma aberration, however, there is a problem that configuration must be such that an aberration correcting element, which corrects both of the aberration, is provided in the light path leading the laser light emitted from a laser diode to the objective lens and also is displaced in the two-axis direction to correct the coma aberration, and the complication of the structure of optical system is unavoidable and therefore this technology is not suitable for the optical pickup apparatus for which accuracy is required.

SUMMARY OF THE INVENTION

An optical pickup apparatus according to an aspect of the present invention, for reading out a signal recorded on a signal recording layer of a first and a second optical discs that are different in distance from an incident surface of a laser light to the signal recording layer, comprises: an objective lens configured to be changed in numerical aperture thereof for reading out a signal from the first and the second optical discs; a focus coil configured to displace the objective lens in a direction toward a surface of the first and the second optical discs; a tracking coil configured to displace the objective lens in a radial direction of the first and the second optical discs; a tilt coil configured to correct an angle of an optical axis of the objective lens relative to the surface of the first and the second optical discs; a numerical aperture changing element configured to change numerical aperture of the objective lens so that the laser light is focused on the signal recording layer of the first and the second optical discs; an incident angle changing element configured to change an incident angle of the laser light relative to the objective lens so that the laser light is focused on the signal recording layer of the first and the second optical discs; and a tilt control unit configured to control driving of the tilt coil so as to correct coma aberration.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
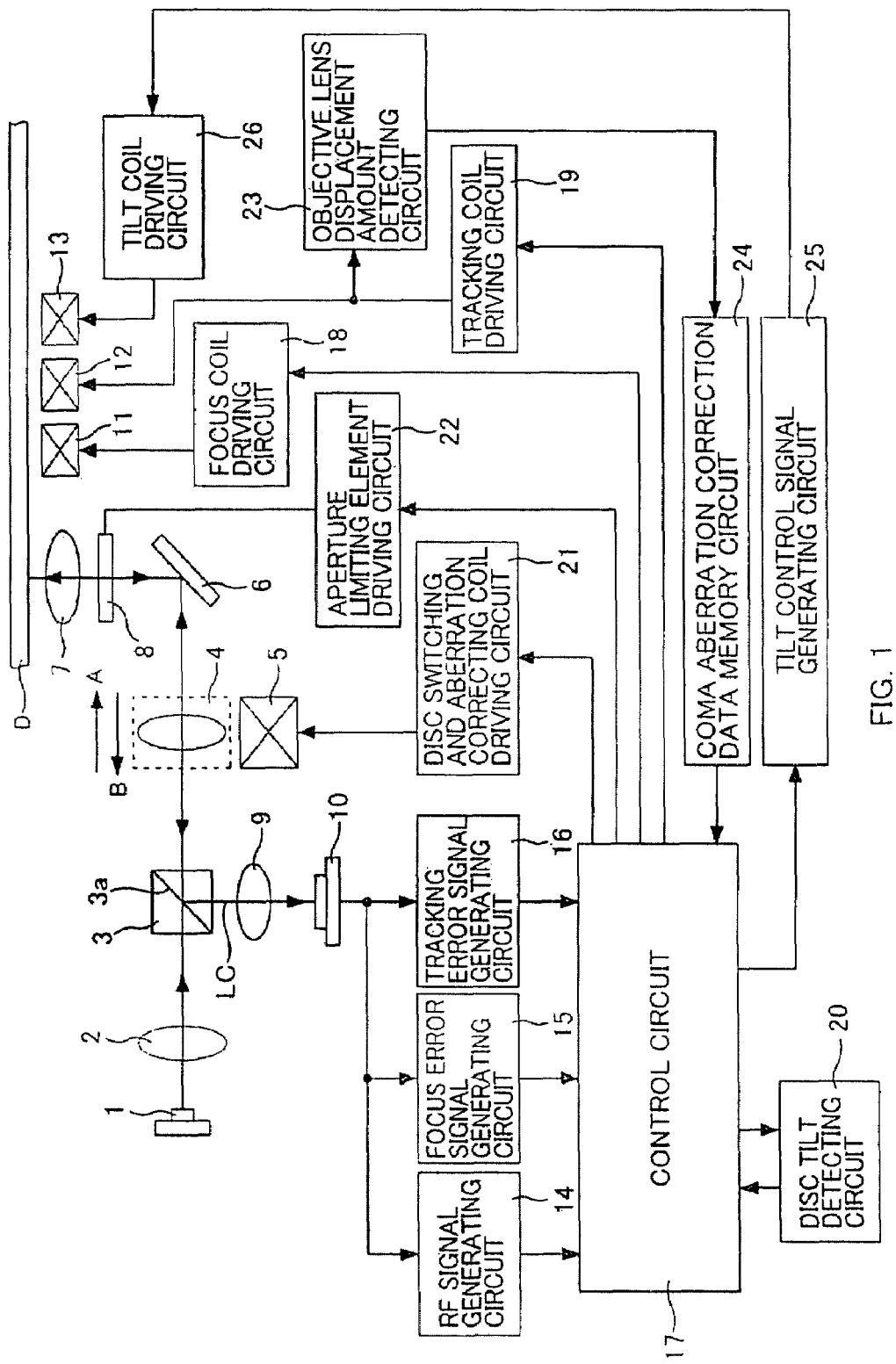
FIG. 1 is a diagram illustrating an operation of an optical pickup apparatus according to one embodiment of the present invention.

At least the following details will become apparent from descriptions of this specification and of the accompanying drawings. FIG. 1 shows only optical parts required for an operation according to the present invention and does not show: a diffraction grating that generates a 0th-order light as a main beam and +1st-order light and −1st-order light as sub-beams; or a quarter-wave plate that changes the phase of the laser light, etc.

In FIG. 1, reference numeral 1 represents a laser diode that radiates a laser light that is a blue light with 405 nm wavelength and reference numeral 2 represents a collimating lens, to which the laser light that is a diverging light radiated by the laser diode 1 is emitted, and which performs a function of changing the incident diverging light to a parallel light. Reference numeral 3 represents a polarizing beam splitter, to which the laser light that is the parallel light emitted from the collimating lens 2 is projected, and which includes a reflective film 3a that allows the laser light emitted from the collimating lens 2 to pass therethrough and also reflects a return light reflected by and coming back from an optical disc D, as will be described later.

Reference numeral 4 represents a laser light path controlling element (incident angle changing element) that is provided on the light path of the laser light having passed therethrough the reflective film 3a of the polarizing beam splitter 3, is displaced in the direction of the optical axis of the laser light, that is, in the directions of an arrow A and an arrow B in the diagram, by a disc switching operation, and performs a function of changing the incident angle of the laser light, which is an incoming parallel light, to the objective lens which will be described later. The laser light path controlling element 4 also has a function of correcting the spherical aberration generated by the cover layer of the optical disc D and is configured to be displaced in the direction of the optical axis by a disc switching and aberration correcting coil 5.

Reference numeral 6 represents a rising mirror that is provided at a position that the laser light having passed through the laser light path controlling element 4 is emitted to and that reflects the incoming laser light in the direction of the objective lens. Reference numeral 7 represents an objective lens that the laser light reflected by the rising mirror 6 is emitted to and that performs a function of focusing the laser light as a spot on the signal recording layer of the optical disc D.

Reference numeral 8 represents an aperture limiting element (numerical aperture changing element) that is provided on the light path of the laser light reflected by the rising mirror 6 and to be emitted to the objective lens 7 and that changes the numerical aperture of the objective lens corresponding to the optical disc D to be used. The aperture limiting element 8 may be configured by utilizing liquid crystal.

In such a configuration, the laser light radiated from the laser diode 1 passes through the collimating lens 2, the polarizing beam splitter 3, the laser light path controlling element 4, the rising mirror 6 and the aperture limiting element 8, to be emitted to the objective lens 7, and then is applied as a spot to the signal recording layer of the optical disc D by a focusing operation of the objective lens 7, to be reflected to become the return light.

The return light reflected by the signal recording layer of the optical disc D passes through the objective lens 7, the aperture controlling element 8, the rising mirror 6, and the laser light path controlling element 4, to be emitted to the reflective film 3a of the polarizing beam splitter 3. The return light thus emitted to the reflective film 3a of the polarizing beam splitter 3 has been changed into the laser light polarized by changing a phase with the use of the quarter-wave plate and therefore, the return light is not passed therethrough, but is reflected by the reflective film 3a, to become a control laser light Lc.

Reference numeral 9 represents a sensor lens that the control laser light Lc reflected by the reflective film 3a of the polarizing beam splitter 3 is emitted to and that performs a function of condensing and applying the control laser light Lc to a light-receiving area provided in a photodetector 10 called a PDIC. The photodetector 10 is provided with a known 4-split sensor, etc., and is configured to perform a signal generating operation in accordance with an operation of reading out the signal recorded on the signal recording layer of the optical disc D by an irradiating operation of the main beam, the signal generating operation for performing a focusing controlling operation by the astigmatism method, and the signal generating operation for performing a tracking controlling operation by an irradiating operation of two sub-beams.

An optical pickup apparatus according to the present invention is configured as described above and in such a configuration, the objective lens 7 is fixed to a lens holding frame (not shown) supported on a base of the optical pickup apparatus by four supporting wires so as to be capable of displacing in the vertical direction relative to the signal surface of the optical disc D and in the radial direction of the optical disc D.

Reference numeral 11 represents a focus coil provided on the lens holding frame that the objective lens is fixed to and has a function of displacing the objective lens 7 in the vertical direction relative to the signal surface of the optical disc D (toward the signal surface) in cooperation with a magnet fixed to the base. Reference numeral 12 represents a tracking coil provided on the lens holding frame that the objective lens is fixed to and has a function of displacing the objective lens 7 in the radial direction of the optical disc D in cooperation with the magnet fixed to the base.

An optical pickup apparatus according to the present invention includes a tilt adjusting function of being capable of adjusting the angle of the optical axis of the objective lens 7 relative to the signal surface of the optical disc D and reference numeral 13 represents a tilt coil for performing such a tilt adjustment.

The configuration of the optical pickup apparatus including the focus coil 11, the tracking coil 12, and the tilt coil 13, described above, and the focusing controlling operation, the tracking controlling operation, and the tilt controlling operation by driving operations of each coil is known and the description thereof is omitted.

Reference numeral 14 represents an RF signal generating circuit that generates an RF signal, which is a signal obtained in accordance with the operation of reading out the signal recorded on the signal recording layer of the optical disc D, from a sensor for receiving the main beam, which is included in the photodetector 10. Reference numeral 15 represents a focus error signal generating circuit that generates a focus error signal, which is a signal obtained in accordance with a focusing operation of the laser light, from the sensor for receiving the main beam. Reference numeral 16 represents a tracking error signal generating circuit that generates a tracking error signal, which is a signal obtained in accordance with a tracking operation of the laser light from a sensor for receiving a sub-beam.

Reference numeral 17 represents a control circuit that performs various operations of controlling the optical pickup apparatus based on signals obtained from the RF signal generating circuit 14, the focus error signal generating circuit 15, the tracking error signal generating circuit 16, etc. Reference 18 represents a focus coil driving circuit: that a focus control signal is input to, which is output from the control circuit 17 based on the focus error signal generated by, and input from, the focus error signal generating circuit 15; and that is configured to supply a driving signal to the focus coil 11. Reference numeral 19 represents a tracking coil driving circuit: that a tracking control signal is input to, which is output from the control circuit 17 based on the tracking error signal generated by, and input from, the tracking error signal generating circuit 16; and that is configured to supply a driving signal to the tracking coil 12.

Reference numeral 20 represents a disc tilt detecting circuit (tilt detecting circuit) that detects the tilt of the optical disc D relative to a reference plane when the optical disc D is placed on the turntable (not shown). A detecting operation by such a disc tilt detecting circuit can be performed, for example, by utilizing a change of a DC voltage which is supplied to the focus coil 11 and which changes in accordance with the focus controlling operation performed during the time when the optical pickup apparatus is shifted from the inner circumference side to the outer circumference side of the optical disc D. That is, in the case that the optical disc has a tilt, the distance between the objective lens 7 and the signal recording layer of the optical disc D changes as the optical pickup apparatus is shifted from the inner circumference side to the outer circumference side, and by measuring the degree of change of a DC driving signal for displacing the objective lens 7 in the vertical direction relative to the direction of the signal surface of the optical disc D to correct such change of the distance between them, the degree of tilt of the optical disc D may be recognized.

The tilt of the optical disc D can be detected by providing a tilt-detecting light emitting diode for applying a light to the signal surface of the optical disc D and utilizing such as the change of the angle of reflection of the light emitted from the light emitting diode to the signal surface of the optical disc D. Since such technology is known, the description thereof is omitted.

Reference numeral 21 represents a disc switching and aberration correcting coil driving circuit: that supplies a driving signal to the disc switching and aberration correcting coil 5 in order to displace the laser light path controlling element 4 to the position suitable for each optical disc D, depending on the type of optical disc D to be used; and that is configured to output the driving signal based on the drive controlling signal output from the control circuit 17. Reference numeral 22 represents an aperture limiting element driving circuit: that supplies a driving signal so that the aperture limiting element 8 may be switched to a state of providing the numerical aperture suitable for each optical disc D, depending on the type of optical disc D used; and that is configured to output the driving signal based on the drive controlling signal output from the control circuit 17.

As described above, the disc switching and aberration correcting coil driving circuit 21 and the aperture limiting element driving circuit 22 are switched so as to become in the state suitable for each optical disc D depending on the type of optical disc D to be used. For example, when the optical disc D is a first optical disc that is the optical disc of the Blu-ray standard, the thickness of the cover layer C1, which is the protective layer provided over the signal recording layer L1, is as small as 0.1 mm, as shown in FIG. 2, and the laser light path controlling element 4 is displaced and held by the driving operation of the disc switching and aberration correcting coil 5 at the position at which the laser light Lb is emitted as a parallel light to the objective lens 7, and the aperture limiting element 8 is held by the driving operation of the aperture limiting element driving circuit 22 so that the numerical aperture of the objective lens 7 becomes 0.85.

Figure 3:
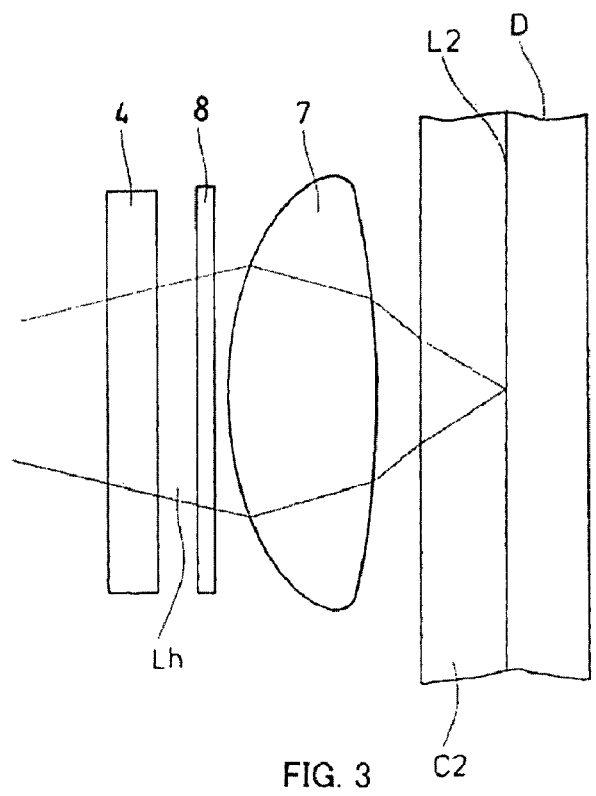
FIG. 3 is a diagram illustrating other relationship between the laser light and the optical disc in an optical pickup apparatus according to one embodiment of the present invention.

When the optical disc D is a second optical disc that is the optical disc of the HD-DVD standard, as shown in FIG. 3, the thickness of the cover layer C2 which is the protective layer provided over the signal recording layer L2 is as great as 0.6 mm, and the laser light path controlling element 4 is displaced and held by the driving operation of the disc switching and aberration correcting coil 5 at the position at which the laser light Lh is emitted as a diverging light to the objective lens 7, and the aperture limiting element 8 is held by the driving operation of the aperture limiting element driving circuit 22 so that the numerical aperture of the objective lens 7 becomes 0.65.

Figure 2:
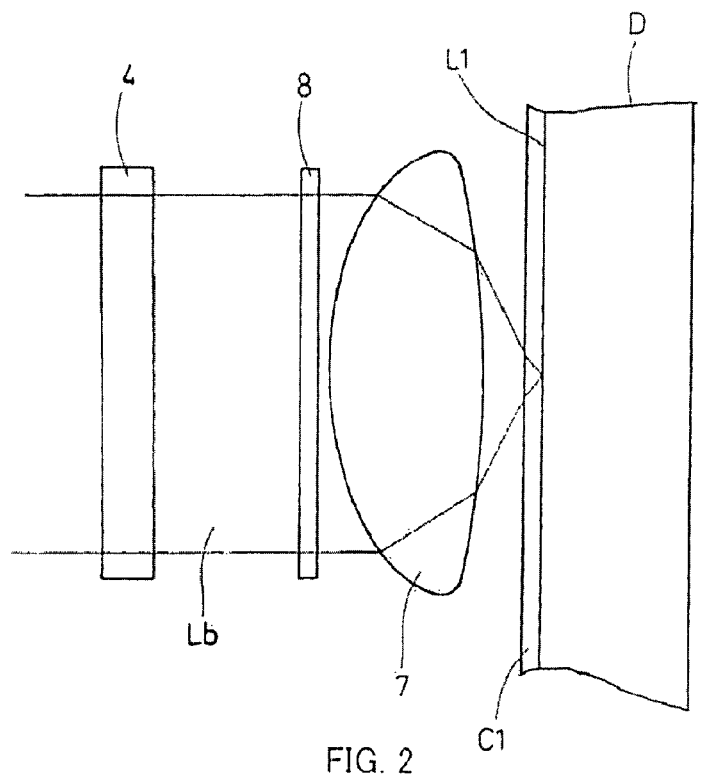
FIG. 2 is a diagram illustrating a relationship between a laser light and an optical disc in an optical pickup apparatus according to one embodiment of the present invention.

By controlling the switching of the laser light path controlling element 4 and the aperture limiting element 8 depending on the type of optical disc D, the laser light may be focused on each of the signal recording layers L1 and L2 of respective optical discs D as shown in FIGS. 2 and 3. As a method of distinguishing the type of optical disc D to be used, there is, for example, a method of utilizing the focus error signal to be obtained from the focus error signal generating circuit 15 when the objective lens 7 is displaced in the direction of the signal surface of the optical disc D.

The reference numeral 23 represents an objective lens displacement amount detecting circuit (displacement amount detecting circuit) that detects the displacement amount of the objective lens 7, that is, the displacement amount of the objective lens 7 relative to the base included in the optical pickup apparatus, from the driving signal supplied from the tracking coil driving circuit 19 to the tracking coil 12. A signal track provided on the signal recording layer of the optical disc D is spirally formed, and therefore, in order to cause the laser spot to follow the signal track, the objective lens 7 must be displaced in the radial direction of the optical disc D.

The operation of displacing the objective lens 7, in the radial direction of the optical disc D, toward the outer circumference is performed by gradually increasing the DC voltage of the driving signal supplied from the tracking coil driving circuit 19 to the tracking coil 12. Therefore, by detecting the magnitude of this DC voltage, the displacement amount of the objective lens 7 relative to the base can be recognized.

It is known that the coma aberration caused when performing the operation of reading out the signal recorded in the optical disc D is in a proportional relationship to the displacement amount of the objective lens 7. The present invention has been conceived giving attention to this point, and reference numeral 24 represents a coma aberration correction data memory circuit (memory circuit) that stores correction data suitable for correcting the coma aberration in accordance with the displacement amount of the objective lens 7, which has detected by the objective lens displacement amount detecting circuit 23. That is, the coma aberration correction data memory circuit 24 stores the data for performing a tilt correcting operation suitable for correcting the coma aberration caused from the displacement of the objective lens 7.

Reference numeral 25 represents a tilt control signal generating circuit: that a control signal is input to, which is output from the control circuit 17 based on the signal obtained from the disc tilt detecting circuit 20 and the signal obtained from the coma aberration correction data memory circuit 24; and that is configured to output a tilt control signal for performing a tilt controlling operation. Reference numeral 26 represents a tilt coil driving circuit: that the tilt control signal is input to, which is output from the tilt control signal generating circuit 25; and that is configured to supply a driving signal to the tilt coil 13.

A tilt control unit includes the control circuit 17, the objective lens displacement amount detecting circuit 23, the coma aberration correction data memory circuit 24, the tilt control signal generating circuit 25, and the tilt coil driving circuit 26.

When the optical disc D is placed on the turntable, an operation is performed for recognizing the type of the optical disc D. If the optical disc D is recognized as the first optical disc, then a signal for bringing about a state of performing the operation of reading out the signal recorded on the signal recording layer L1 of the first optical disc is output from the control circuit 17 to the disc switching and aberration correcting coil driving circuit 21.

When such a signal is input to the disc switching and aberration correcting coil driving circuit 21, a driving signal is output from the disc switching and aberration correcting coil driving circuit 21 to the disc switching and aberration correcting coil 5. As a result, the laser light path controlling element 4 is displaced to an operational position for the first optical disc in the direction of the arrow B. FIG. 2 shows the state in which the laser light path controlling element 4 has been displaced to such an operational position for the first optical disc and the laser light Lb is emitted as a parallel light to the objective lens 7.

While, when the optical disc D is recognized as the first optical disc, the signal for bringing about a state for performing the operation of reading out the signal recorded on the signal recording layer L1 of the first optical disc is output from the control circuit 17 to the disc switching and aberration correcting coil driving circuit 21 as described above, at this time, a signal for bringing about a state for performing the operation of reading out the signal recorded on the signal recording layer L1 of the first optical disc is also output to the aperture limiting element driving circuit 22.

When such a signal is input to the aperture limiting element driving circuit 22, a driving signal is output from the aperture limiting element driving circuit 22 to the aperture limiting element 8. As a result, the aperture limiting element 8 becomes in the state of limiting the numerical aperture of the objective lens 7 to 0.85.

FIG. 2 shows the state where: the laser light path controlling element 4 and the aperture limiting element 8 are in the operational position and the aperture limiting position for the first optical disc, which is suitable for performing the operation of reading out the signal recorded on the signal recording layer L1 of the first optical disc; and the laser light spot can be focused on the signal recording layer L1. In such a state, since the focus error signal generated by the focus error signal generating circuit 15 and the tracking error signal generated by the tracking error signal generating circuit 16, based on the signal obtained from the photodetector 10, are input to the control circuit 17, the focus coil 11 performs the operation of displacing the objective lens 7 in the direction of the signal surface of the optical disc D and the tracking coil 12 performs the operation of displacing the objective lens 7 in the radial direction of the optical disc D.

Therefore, with the focus controlling operation and the tracking controlling operation of the optical pickup apparatus being performed, an operation of reproducing the signal recorded on the signal recording layer L1 of the optical disc D can be performed. Such a reproduced signal may be obtained as information data by demodulating the RF signal generated by the RF signal generating circuit 14.

While, as described above, the laser light path controlling element 4 is caused to shift to the operational position for the first optical disc suitable for reading out the signal recorded on the signal recording layer L1, such operational position for the first optical disc is set at such a position that the least spherical aberration occurs. The operation of setting such a position may be performed by setting a position at which the value of jitter contained in the reproduced signal becomes an optimum value, a position at which the RF signal level comes to a maximum, or a position at which the tracking error signal level comes to a maximum.

While the spherical aberration may be restrained to the least, which appears in the spot of the laser light emitted to the objective lens 7 and applied to the signal recording layer L1 of the optical disc D, by performing the adjusting operations described above, the coma aberration is caused from the displacement of the objective lens 7 in the radial direction. Since the value of the DC voltage changes, which is contained in the driving signal supplied from the cracking coil driving circuit 19 to the tracking coil 12 when the objective lens is displaced in the radial direction, an operation of detecting the displacement amount of the objective lens 7 is performed by detecting the value of such DC voltage by the objective lens displacement amount detecting circuit 23.

With the detecting operation being performed by the objective lens displacement amount detecting circuit 23, an output of the detection is input to the coma aberration correction data memory circuit 24. As a result, based on the data stored in the coma aberration correction data memory circuit 24, a coma aberration correcting tilt control signal for correcting the coma aberration corresponding to the displacement amount of the objective lens 7 is output to the control circuit 17.

When the coma aberration correcting tilt control signal is input from the coma aberration correction data memory circuit 24 to the control circuit 17, there is input to the tilt control signal generating circuit 25 a control signal that is obtained by adding: a signal set for performing the tilt adjustment in accordance with the tilt of the disc which has been detected in advance by the disc tilt detecting circuit 20; and the coma aberration correcting tilt control signal.

When such a control signal is input to the tilt control signal generating circuit 25, a tilt control signal is output from the tilt control signal generating circuit 25 to the tilt coil driving circuit 26. When such a tilt control signal is input to the tilt coil driving circuit 26, a driving signal is supplied from the tilt coil driving circuit 26 to the tilt coil 13. When such a driving signal is supplied to the tilt coil 13, the tilt coil 13 performs an operation of changing the optical axis of the objective lens 7 relative to the signal surface of the optical disc D, that is, a tilt adjusting operation. By performing such a tilt controlling operation, the coma aberration can be restrained.

While the preceding description relates to the operation when the optical disc D is the first optical disc, description will then be made of the operation when the optical disc D is the second optical disc.

When the optical disc D is recognized as the second optical disc, then a signal for bringing about a state for performing an operation of reading out the signal recorded on the signal recording layer L2 of the second optical disc is output from the control circuit 17 to the disc switching and aberration correcting coil driving circuit 21.

When such a signal is input to the disc switching and aberration correcting coil driving circuit 21, a driving signal is output from the disc switching and aberration correcting coil driving circuit 21 to the disc switching and aberration correcting coil 5. As a result, the laser light path controlling element 4 is displaced, in the direction of the arrow A, to an operational position for the second optical disc. FIG. 3 shows the state, where the laser light path controlling element 4 has been displaced to such an operational position for the second optical disc, and the laser light Lh is emitted as a diverging light to the objective lens 7.

While, when the optical disc D is recognized as the second optical disc, a signal for bringing about a state for performing the operation of reading out the signal recorded on the signal recording layer L2 of the second optical disc is output from the control circuit 17 to the disc switching and aberration correcting coil driving circuit 21 as described above, at this time, a signal for bringing about a state for performing the operation of reading out the signal recorded on the signal recording layer L2 of the second optical disc is also output to the aperture limiting element driving circuit 22.

When such a signal is input to the aperture limiting element driving circuit 22, a driving signal is output from the aperture limiting element driving circuit 22 to the aperture limiting element 8. As a result, the aperture limiting element 8 comes to the state of limiting the numerical aperture of the objective lens 7 to 0.65.

FIG. 3 shows the state, where the laser light path controlling element 4 and the aperture limiting element 8 are in the operational position and the aperture limiting position for the second optical disc, suitable for performing the operation of reading out the signal recorded on the signal recording layer L2 of the second optical disc, and the laser light can be focused on the signal recording layer L2. In such a state, since the focus error signal generated by the focus error signal generating circuit 15 and the tracking error signal generated by the tracking error signal generating circuit 16, based on the signal obtained from the photodetector 10, are input to the control circuit 17, the focus coil 11 performs the operation of displacing the objective lens 7 in the direction of the signal surface of the optical disc D, and the tracking coil 12 performs the operation of displacing the objective lens 7 in the radial direction of the optical disc D.

Therefore, with the focus controlling operation and the tracking controlling operation of the optical pickup apparatus being performed, an operation of reproducing the signal recorded on the signal recording layer L2 of the optical disc D can be performed. Thus reproduced signal can be obtained as information data by demodulating the RF signal generated by the RF signal generating circuit 14.

While, as described above, the laser light path controlling element 4 is caused to shift to the operational position for the second optical disc, which is suitable for reading out the signal recorded on the signal recording layer L2, such operational position for the second optical disc is set at such a position that the least spherical aberration occurs. The operation of setting such a position may be performed by setting a position at which the value of jitter contained in the reproduced signal becomes an optimum value, a position at which the RF signal level comes to a maximum, or a position at which the tracking error signal level comes to a maximum.

While the spherical aberration may be restrained to the least, which appears in the spot of the laser light emitted to the objective lens 7 and applied to the signal recording layer L2 of the optical disc D by performing the adjusting operations described above, the coma aberration is caused from the displacement of the objective lens 7 in the radial direction. Since the value of the DC voltage changes, which is contained in the driving signal supplied from the tracking coil driving circuit 19 to the tracking coil 12 when the objective lens 7 is displaced in the radial direction, an operation of detecting the displacement amount of the objective lens 7 is performed by detecting the value of such DC voltage by the objective lens displacement amount detecting circuit 23.

With the detecting operation being performed by the objective lens displacement amount detecting circuit 23, an output of the detection is input to the coma aberration correction data memory circuit 24. As a result, based on the data stored in the coma aberration correction data memory circuit 24, a coma aberration correcting tilt control signal for correcting the coma aberration in accordance with the displacement amount of the objective lens 7 is output to the control circuit 17.

When the coma aberration correcting tilt control signal is input from the coma aberration correction data memory circuit 24 to the control circuit 17, there is input to the tilt control signal generating circuit 25 a control signal that is obtained by adding: a signal set for performing the tilt adjustment in accordance with the tilt of the disc which has been detected in advance by the disc tilt detecting circuit 20; and the coma aberration correcting tilt control signal.

When such a control signal is input to the tilt control signal generating circuit 25, a tilt control signal is output from the tilt control signal generating circuit 25 to the tilt coil driving circuit 26. When such a tilt control signal is input to the tilt coil driving circuit 26, a driving signal is supplied from the tilt coil driving circuit 26 to the tilt coil 13. When such a driving signal is supplied to the tilt coil 13, the tilt coil 13 performs an operation of changing the optical axis of the objective lens 7 relative to the signal surface of the optical disc D, that is, a tilt adjusting operation. By performing such a tilt controlling operation, the coma aberration can be restrained.

Since the relationship between the magnitude of the coma aberration caused and the displacement amount of the objective lens differs between the first optical disc and the second optical disc, the correction data suitable for correcting the coma aberration of each optical disc is to be stored in the coma aberration correction data memory circuit 24.

The present embodiment, designed to correct The coma aberration utilizing the tilt coil provided to correct the tilt of the optical axis relative to the signal surface of the optical disc, makes it possible to simplify the optical configuration of the optical pickup apparatus configured to perform the operation of reading out the signal recorded in the optical discs of different standards in which the signal recording layer is provided in the position with different distances from the laser light incident surface, by changing the numerical aperture of the objective lens.

Therefore, the present embodiment enables not only improvement of the signal reproducing characteristics and the signal recording characteristics of the optical pickup apparatus but also manufacture of the optical pickup apparatus at low cost.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus for reading out a signal recorded on a signal recording layer of a first and a second optical discs that are different in distance from an incident surface of a laser light to the signal recording layer, comprising:
    an objective lens configured to be changed in numerical aperture thereof for reading out a signal from the first and the second optical discs;
    a focus coil configured to displace the objective lens in a direction toward a surface of the first and the second optical discs;
    a tracking coil configured to displace the objective lens in a radial direction of the first and the second optical discs;
    a tilt coil configured to correct an angle of an optical axis of the objective lens relative to the surface of the first and the second optical discs;
    a numerical aperture changing element configured to change numerical aperture of the objective lens so that the laser light is focused on the signal recording layer of the first and the second optical discs;
    an incident angle changing element configured to change an incident angle of the laser light relative to the objective lens so that the laser light is focused on the signal recording layer of the first and the second optical discs; and
    a tilt control unit configured to control driving of the tilt coil so as to correct coma aberration, the tilt control unit including
        a displacement amount detecting circuit configured to detect a displacement amount of the objective lens in the radial direction based on a DC voltage supplied to the tracking coil, and a memory circuit connected to the displacement amount detecting circuit and configured to store correction data for correcting the coma aberration in accordance with the detected displacement amount, wherein the tilt control unit is further configured to generate a driving current to be supplied to the tilt coil based on the detected displacement amount and the correction data read out from the memory circuit, wherein the read out correction data corresponds to the detected displacement amount.

2. The optical pickup apparatus of claim 1, further comprising:
    a tilt detecting circuit configured to detect a tilt of the first and the second optical discs on a turntable relative to a reference plane, wherein
        the tilt control unit is further configured to generate a driving current to be supplied to the tilt coil based on the correction data read out from the memory circuit and a tilt of the optical disc on the turntable detected by the tilt detecting circuit.

3. The optical pickup apparatus of claim 1, wherein the correction data stored in the memory circuit includes first correction data for correcting the coma aberration in accordance with a detected displacement amount for the first optical disc, and different, second correction data for correcting the coma aberration in accordance with a detected displacement amount for the second optical disc.

4. The optical pickup apparatus of claim 1, wherein the second optical disc exhibits a different standard type and thickness than the first optical disc.

5. An optical pickup apparatus for applying a laser light condensed by an objective lens to an incident surface of an optical disc and reading out a signal recorded on a signal recording layer, comprising:
    a focus coil configured to displace the objective lens in a direction toward a surface of the optical disc;
    a tracking coil configured to displace the objective lens in a radial direction of the optical disc;
    a tilt coil configured to correct an angle of an optical axis of the objective lens relative to the surface of the optical disc;
    an incident angle changing element configured to change an incident angle of the laser light relative to the objective lens so that the laser light is focused on the signal recording layer of the optical disc; and
    a tilt control unit configured to control driving of the tilt coil so as to correct coma aberration, the tilt control unit including
        a displacement amount detecting circuit configured to detect a displacement amount of the objective lens in the radial direction based on a DC voltage supplied to the tracking coil, and a memory circuit connected to the displacement amount detecting circuit and configured to store correction data for correcting the coma aberration in accordance with the detected displacement amount, wherein the tilt control unit is further configured to generate a driving current to be supplied to the tilt coil based on the detected displacement amount and the correction data read out from the memory circuit, wherein the read out correction data corresponds to the detected displacement amount.

6. The optical pickup apparatus of claim 5, further comprising:
    an objective lens configured to be changed in numerical aperture thereof for reading out a signal from a first and a second optical discs as the optical disc, which are different in distance from an incident surface of a laser light to a signal recording layer; and
    a numerical aperture changing element configured to change numerical aperture of the objective lens so that the laser light is focused on the signal recording layer of the first and the second optical discs; and
    a tilt detecting circuit configured to detect a tilt of the first and the second optical discs on a turntable relative to a reference plane,
        wherein the tilt control unit is further configured to generate a driving current to be supplied to the tilt coil based on the detected displacement amount, the correction data read out from the memory circuit and a tilt of the optical disc on the turntable detected by the tilt detecting circuit, wherein the read out correction data corresponds to the detected displacement amount.

* * * * *

UNITED STATES PATENT AND TRADEMARK OFFICE
CERTIFICATE OF CORRECTION

PATENT NO. : 7,898,919 B2  
APPLICATION NO. : 11/864628  
DATED : March 1, 2011  
INVENTOR(S) : Ryoichi Kawasaki et al.

Page 1 of 1

It is certified that error appears in the above-identified patent and that said Letters Patent is hereby corrected as shown below:

In column 12, line 50, in claim 6, delete "layer; and" and insert -- layer; --, therefor.

Signed and Sealed this
Tenth Day of May, 2011

David J. Kappos
*Director of the United States Patent and Trademark Office*